United States Patent
Chen et al.

[11] Patent Number: 6,141,121
[45] Date of Patent: *Oct. 31, 2000

[54] METHOD AND APPARATUS FOR COLOR HALFTONING

[75] Inventors: Kok S. Chen, Sunnyvale; Magnus L. Karlsson, Milpitas, both of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/941,121

[22] Filed: Sep. 30, 1997

Related U.S. Application Data

[63] Continuation of application No. 08/397,601, Mar. 2, 1995, abandoned.

[51] Int. Cl.[7] .............................. G06F 15/00; H04N 1/40; H04N 1/46
[52] U.S. Cl. ......................... 358/534; 358/456; 358/536; 395/109
[58] Field of Search ................... 358/429, 455, 358/456, 457, 465, 466, 500, 534, 451, 454, 524, 536, 298; 382/237, 270; 395/109

[56] References Cited

U.S. PATENT DOCUMENTS

| | | | |
|---|---|---|---|
| 5,124,803 | 6/1992 | Troxel | 358/456 |
| 5,166,809 | 11/1992 | Surbrook | 358/456 |
| 5,359,430 | 10/1994 | Zhang | 358/456 |
| 5,526,445 | 6/1996 | Smutek et al. | 358/457 |
| 5,592,592 | 1/1997 | Shu | 358/456 |
| 5,598,204 | 1/1997 | Harrington | 358/298 |
| 5,633,729 | 5/1997 | Smith et al. | 358/456 |
| 5,689,586 | 11/1997 | Lin | 382/232 |

*Primary Examiner*—Edward L. Coles
*Assistant Examiner*—Mark E. Wallerson
*Attorney, Agent, or Firm*—Nancy R. Simon

[57] ABSTRACT

A method and apparatus for halftoning where at most one halftoned gray, or multi-level, pixel will occur in those halftone cells having a constant area of ink. The method and apparatus includes placing a threshold array and the pixel tonal values within the same range if the threshold array and pixel tonal values are in different ranges. The elements in the threshold array are then compared to the pixel tonal values in order to determine a resulting output value.

The preferred apparatus for halftoning includes a memory for storing the threshold array; a multiplier for multiplying one 8-bit value representing the number of pixels in a halftone cell by a second 8-bit value which is a pixel tonal value; a comparator for comparing the results of the multiplier with an element from the threshold array; and a multiplexer for selecting a resulting output value based upon the output generated by the comparator.

10 Claims, 14 Drawing Sheets

| 1.000 | .3125 | .5625 | .8125 |
|---|---|---|---|
| .7500 | .0625 | .1250 | .3750 |
| .5000 | .0250 | .1875 | .6250 |
| .9375 | .6875 | .4375 | .8750 |
Figure 1 - Prior Art
| 15 | 4 | 8 | 12 |
|---|---|---|---|
| 11 | 0 | 1 | 5 |
| 7 | 3 | 2 | 9 |
| 14 | 10 | 6 | 13 |
Figure 2 - Prior Art
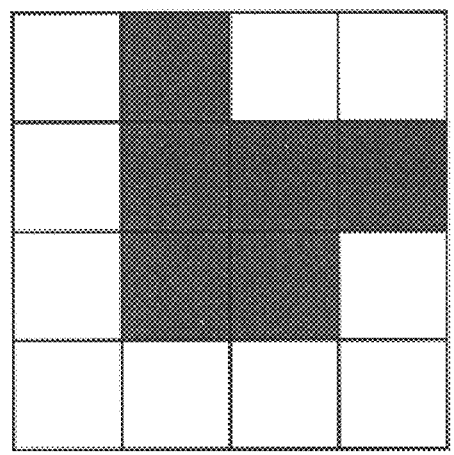
Figure 3 - Prior Art

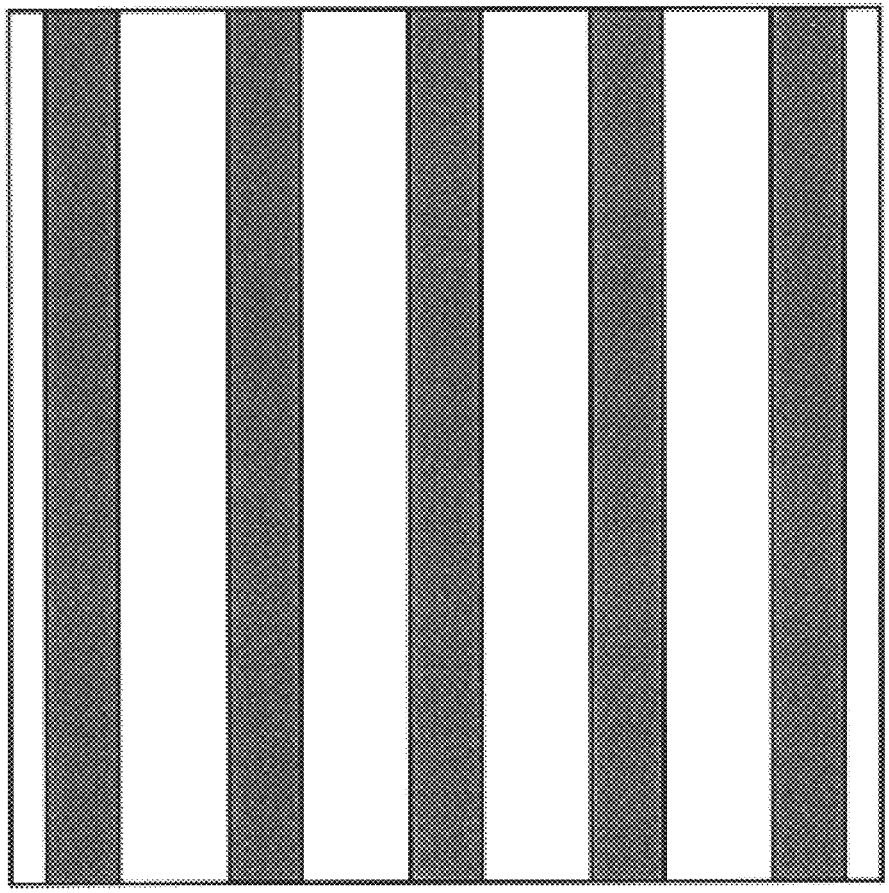
Figure 5 - Prior Art

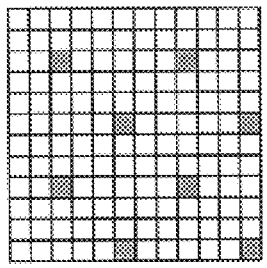
Figure 8a
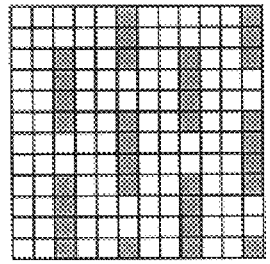
Figure 8d
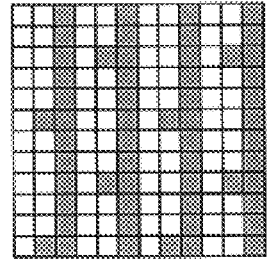
Figure 8g
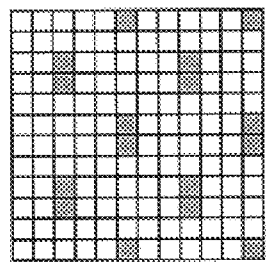
Figure 8b
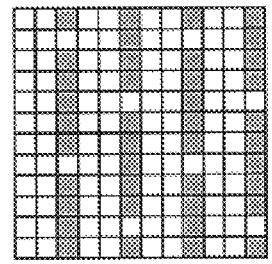
Figure 8e
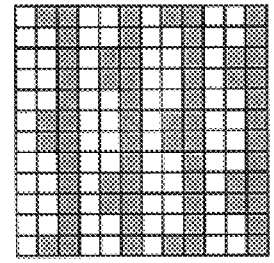
Figure 8h
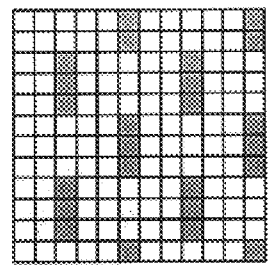
Figure 8c
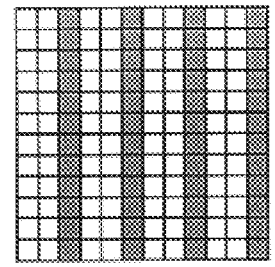
Figure 8f
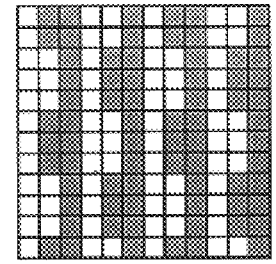
Figure 8i
Figure 8

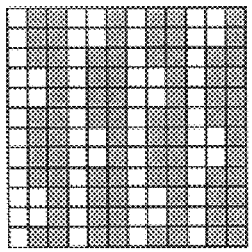
Figure 8j
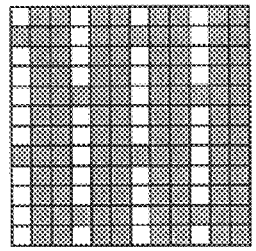
Figure 8m
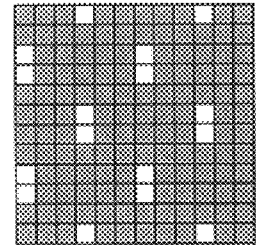
Figure 8p
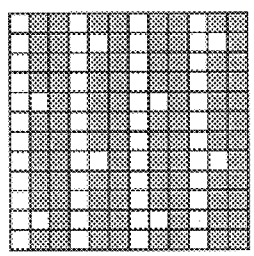
Figure 8k
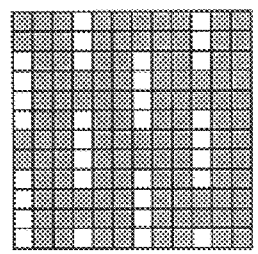
Figure 8n
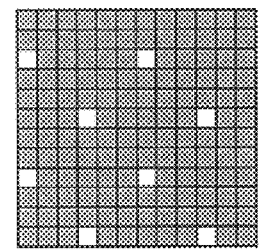
Figure 8q
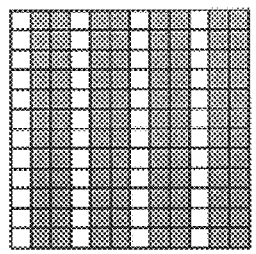
Figure 8l
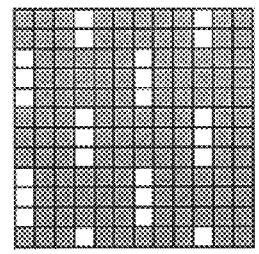
Figure 8o
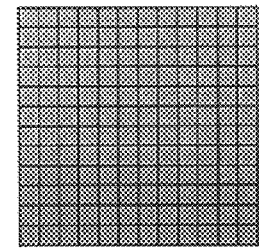
Figure 8r
Figure 8

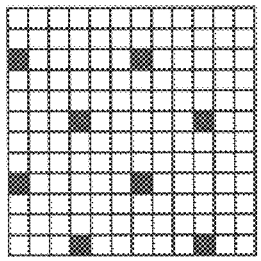
Figure 9a
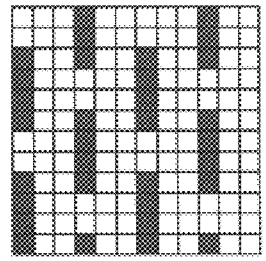
Figure 9d
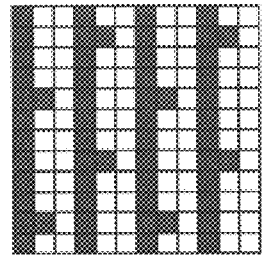
Figure 9g
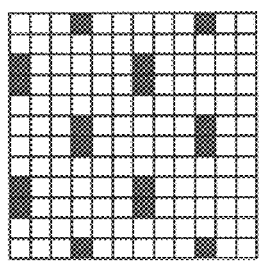
Figure 9b
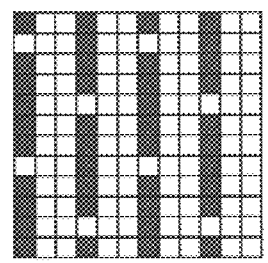
Figure 9e
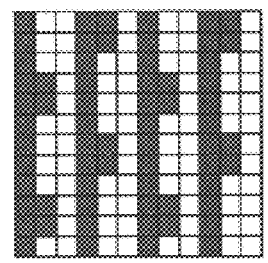
Figure 9h
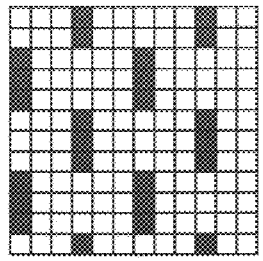
Figure 9c
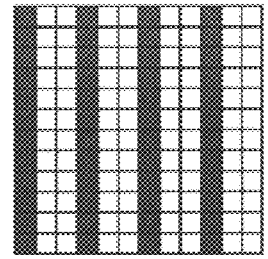
Figure 9f
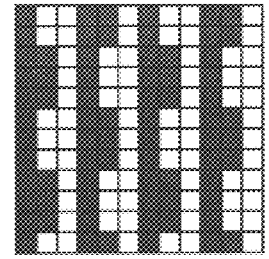
Figure 9i
Figure 9

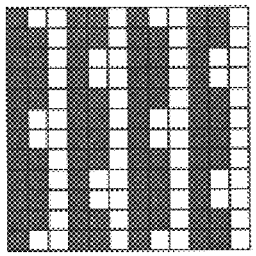
Figure 9j
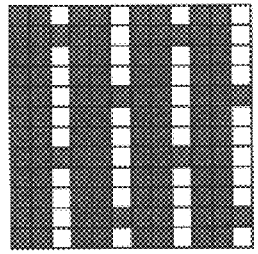
Figure 9m
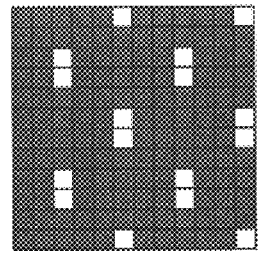
Figure 9p
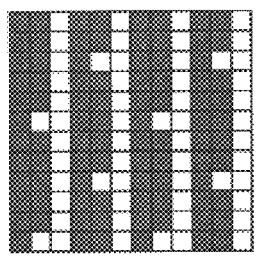
Figure 9k
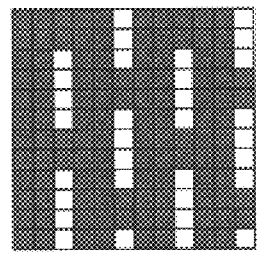
Figure 9n
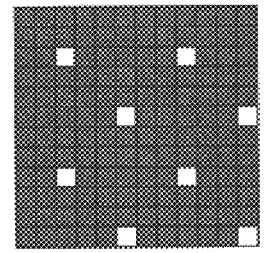
Figure 9q
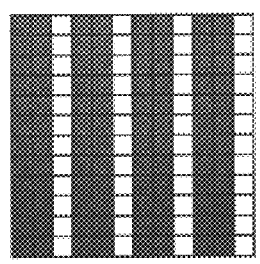
Figure 9l
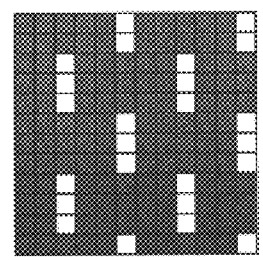
Figure 9o
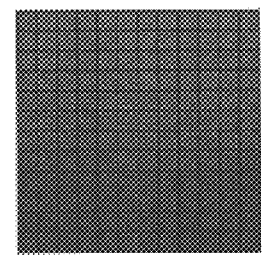
Figure 9r
Figure 9

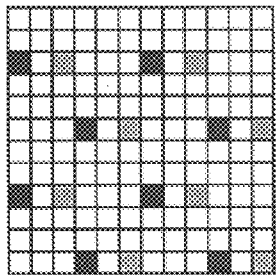
Figure 10a
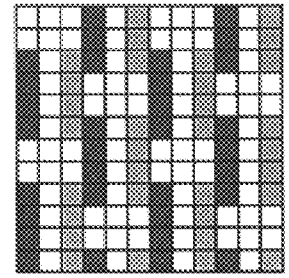
Figure 10d
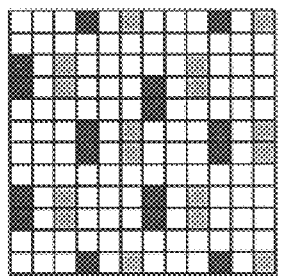
Figure 10b
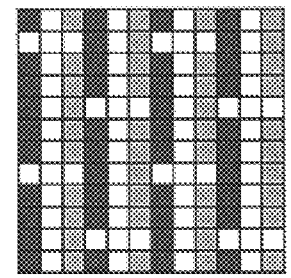
Figure 10e
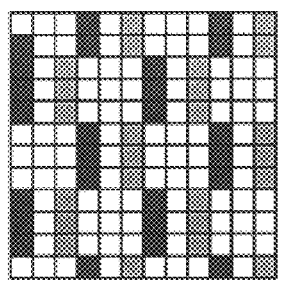
Figure 10c
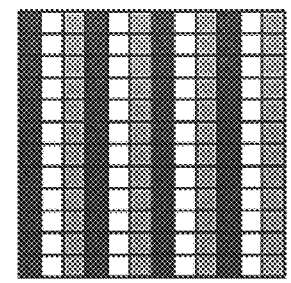
Figure 10f
Figure 10

METHOD AND APPARATUS FOR COLOR HALFTONING

This is a continuation of application Ser. No. 08/397,601, filed Mar. 2, 1995 now abandoned.

BACKGROUND OF THE INVENTION

1. Field of the Invention

The present invention relates generally to the field of image reproduction, and more particularly to digital halftoning. Still more particularly, the present invention relates to a method and apparatus for color halftoning.

2. Description of the Prior Art

A printed color image is a field of tiny dots of typically only four colors of ink arranged meticulously so as to replicate the multiplicity of colors within the color image. Since only four colors of inks are available, it is generally not possible to reproduce a color image exactly like its original. But exact duplication is not necessary. One need only create a believable image, and the human eye and brain will compensate for differences in illumination, color surroundings and tonal range.

Tonal range is important in creating a believable image. Some imaging devices are capable of reproducing acceptable tone directly. Examples of such devices include photography and television. These types of imaging devices can produce continuous tone, or "contone."

Other imaging devices are not able to reproduce acceptable tone directly. These types of devices are typically "binary" or "bi-level" devices and multi-level devices. Bi-level devices produce at any output position only two values; one value corresponds to "on", the other value to "off." One example of a bi-level device is a dot matrix printer. Multi-level devices typically have more than two output values but not as many output values as contone devices. In other words, multi-level devices are devices that have M output values for N input values, where N>M.

Bi-level and multi-level devices have limited tonal range. Intermediate tones, such as varying shades of gray, must be represented by halftones. Halftoning is a process by which continuous-tone colors are approximated by a pattern of pixels that can achieve only a limited number of discrete colors. The most familiar case of this is the rendering of gray tones with black and white pixels, as in a newspaper photograph.

A halftone pattern is made up of a region of pixels referred to as the halftone cell. In conventional digital halftoning (halftoning that uses rational tangent angles), the halftone cell contains a specific, repeatable pattern. The tonal range of a halftone pattern depends upon the number of pixels in the halftone cell.

Pixels are usually arranged on an orthogonal grid, with the pixels placed at evenly spaced lattice points on an output device. A two dimensional array of pixels is often called a pixel map or pixmap. Each pixel in the pixmap has its own unique address on the grid. An image processor uses this address to keep track of each pixel and its associated threshold value.

A threshold value represents the tone value at which the pixel is turned "on." Each pixel within a halftone cell is assigned a threshold value. Typically a threshold array is used to control the individual pixels in a halftone cell. A threshold array can contain one or more halftone cells. The threshold array is replicated and "tiled" (i.e., filled in a non-overlapping manner) over the entire device space. Each pixel in the device space is then mapped to a particular element of the threshold array.

Within any given halftone cell in an image, a certain percentage of the pixels may be "on" and the remaining pixels may be "off." The percentage of pixels that are "on" correspond to the tonal value that the cell represents. For example, if sixty percent of the pixels in a given cell are "on", sixty percent of the pixels in that cell are black and the rest are white. "Black" means solid, or fully saturated. This cell emulates a sixty percent gray tint.

In order to determine whether a pixel is "on" or "off", an imaging device checks a pixel's address, determines the tonal value of the image at that address, and compares the tonal value with the pixel's threshold value in the threshold array. If the tonal value exceeds the threshold value, the pixel is turned "on" when the image is created on the output device.

For each pixel in an image, there is a trade-off between the size of a halftone cell and tonal resolution: the smaller the halftone cell, the smaller the number of pixels it contains, and the fewer tonal values it can represent. Thus, for the best tonal resolution (i.e., the most gray levels), the halftone cell should be large so as to include as many pixels as possible. On the other hand, the bigger the halftone cell, the more visible it becomes to the human eye, distorting the picture at times. This trade-off between number of gray levels and halftone cell size is one of the classic problems of halftoning.

Some color devices, such as color printers, are multi-level devices and have a limited tonal range. Color printers typically have cyan, magenta, yellow and black as the available ink colors. Cyan, magenta and yellow are transparent inks, while black is opaque. Intermediate tones, or varying shades of color, must be represented by halftones. Halftoning in color devices presents added complexity over that of monochromatic imaging.

For example, mechanical misregistration between color planes can cause color shifts. For many types of printers, such as pre-press and inkjet, mechanical misregistration can occur by having the paper feed at an angle, having the paper slide side to side or in the direction of paper movement. This is especially problematic when opaque pixels inadvertently obscure transparent pixels. Mechanical misregistration between color planes can also cause "beat" effects which are known as Moiré patterns. Moiré patterns are interference patterns that can occur when two or more halftone screens are superimposed.

One method used to reduce the effects of mechanical misregistration is to use a halftone screen having a unique frequency and angle for each ink plane. For example, if there are three colors available, one screen may be offset 30 degrees from the underlying screen, and the second screen may be offset 60 degrees from the underlying screen. This solution, however, creates a different type of Moiré pattern, one known as rosettes. Rosettes are undesirable because they impart a low resolution effect on the resulting output. For more information on halftoning, Moiré effects and rosettes, see *PostScript™ Screening: Adobe Accurate Screens™* (1992) by Peter Fink, ISBN 0-672-48544-3.

Unlike inkjet and prepress printers, laser printers have only one predominate type of mechanical misregistration, those that occur in the direction of paper movement. Because mechanical misregistration occurs only in the direction of paper movement, the use of line screens allows for controlling the overlap between transparent and opaque inks without using screens placed at different angles from each other. Such line screens place the toner (i.e., ink) in lines that parallel the direction of paper movement. One problem with line screens, however, is that the placement of the lines must be controlled. Also, the lines must be very thin in order to get a sufficient number of gray levels in very light areas. For example, to obtain 256 levels of gray, the thickness of the line must be controllable to at least 1/256 of full line width. Printing very thin lines can be difficult, if not impossible, for laser printers.

When color inks are added to the output, the problems of controlling line placement and line thinness only intensifies. This is especially true for light color areas, because hue shifts can occur. Hue shifts occur when one color fades out too quickly, and are undesirable because hue shifts alter, sometimes significantly, the quality of a color picture.

SUMMARY OF THE INVENTION

A method and apparatus for halftoning where at most one halftoned gray, or multi-level, pixel will occur in those halftone cells having a constant area of ink. The method and apparatus includes placing a threshold array and the pixel tonal values within the same range if the threshold array and pixel tonal values are in different ranges. The elements in the threshold array are then compared to the pixel tonal values in order to determine a resulting output value.

The preferred apparatus for halftoning includes a memory for storing the threshold array; a multiplier for multiplying one 8-bit value representing the number of pixels in a halftone cell by a second 8-bit value which is a pixel tonal value; a comparator for comparing the results of the multiplier with an element from the threshold array; and a multiplexer for selecting a resulting output value based upon the output generated by the comparator.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 1 is a pictorial representation of a prior art halftone cell threshold array;

FIG. 2 is a pictorial representation of a priority array corresponding to the threshold array illustrated in FIG. 1;

FIG. 3 is a pictorial representation of a halftoned cell representing a forty percent black area based upon the threshold array and priority array depicted in FIGS. 1 and 2;

FIG. 5 is a pictorial representation of a line screen;

FIGS. 8(a)–8(r) are pictorial representations of an area including eight halftone cells which depict a preferred method for halftoning a transparent plane according to the present invention;

FIGS. 9(a)–9(r) are pictorial representations of an area including eight halftone cells which illustrate a preferred method for halftoning an opaque plane according to the present invention;

FIGS. 10(a)–10(f) are pictorial representations of an area including eight halftone cells which depict a preferred method for halftoning opaque and transparent planes having equal amounts of transparent and opaque inks according to the present invention;

DESCRIPTION OF THE PREFERRED EMBODIMENT

With reference now to the figures and in particular with reference to FIG. 1, a pictorial representation of a prior art halftone cell threshold array is shown. Halftone cell 100 is a 4×4 cell and contains 16 pixels. Each pixel is assigned a threshold value 102, shown in FIG. 1 as the number in each pixel. Each threshold value is an element in the threshold array. Assuming the threshold array contains only one halftone cell, the priority array for this halftone cell is:

| 15 | 4  | 8 | 12 |
|----|----|---|----|
| 11 | 0  | 1 | 5  |
| 7  | 3  | 2 | 9  |
| 14 | 10 | 6 | 13 |

Each number is placed in its respective pixel in FIG. 2. The priority array identifies the order in which the pixels will be filled in as the pixel tonal values increase. For example, an area that is 0.4 gray would be halftoned into the pattern illustrated in FIG. 3 on a bi-level device. The pixels with threshold values below 0.4 are turned "on", and the pixels with threshold values greater than 0.4 are "off."

The elements in the priority array in FIG. 2 are arranged in a particular manner to create a pattern or screen. The screen in the priority array for FIG. 2 is one that is known in the art as a cluster dot. A cluster dot is one in which the pixels in the halftone cell are clustered together in order to form halftone dots.

Characteristics of cluster dots include halftone screen frequency, screen angle, halftone dot shape and the growth of the halftone dot size with increasing tonal value. All of these parameters influence the appearance of a printed halftone. Minor variations or inaccuracies can easily become visible as defects in the image.

Figure 4A:
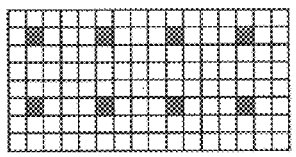
FIGS. 4(a)–4(p) are pictorial representations of an area including eight halftone cells which illustrate a method for halftoning based on the threshold array and priority array depicted in FIGS. 1 and 2.
Figure 4E:
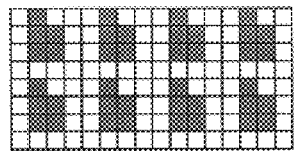
FIG. 4(q) is a pictorial representation of two halftone screens at a 45 degree angle offset from each other showing rosettes.
FIG. 4(r) is a pictorial representation of three halftone screens with rosettes.
Figure 4I:
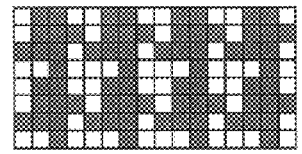
Figure 4B:
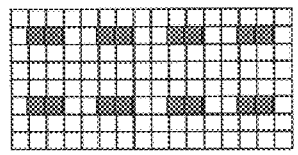
Figure 4F:
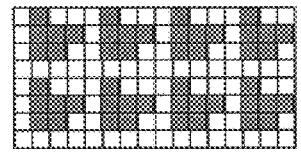
Figure 4J:
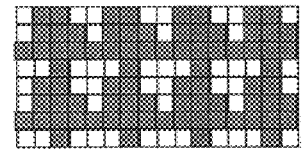
Figure 4C:
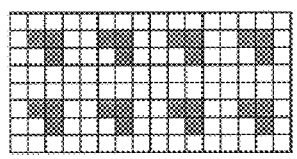
Figure 4G:
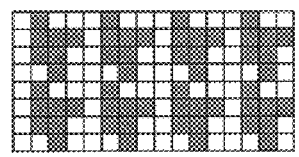
Figure 4K:
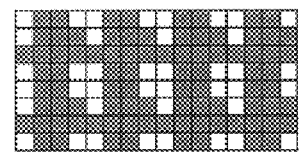
Figure 4D:
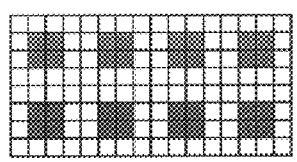
Figure 4H:
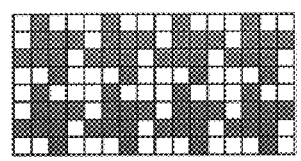
Figure 4L:
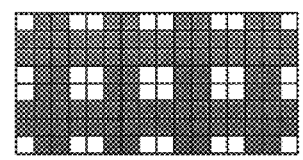
Figure 4M:
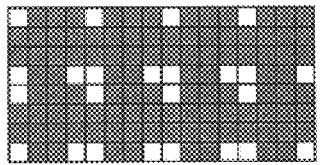
Figure 4N:
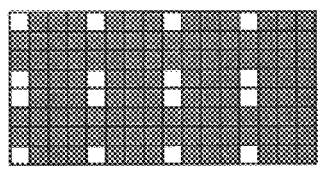
Figure 4O:
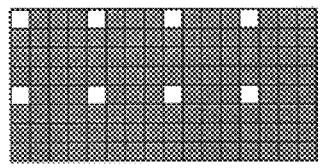
Figure 4P:
Figure 4Q:
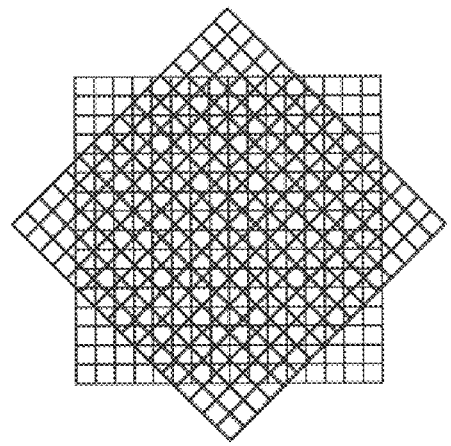

FIGS. 4(a)–4(p) are pictorial representations of an area including eight halftone cells which illustrate a method for halftoning based on the threshold array and priority array depicted in FIGS. 1 and 2. FIG. 4 illustrates how the halftone screen grows as the pixel tonal values increase. In FIG. 4(a), the pixel with the assigned element of "0" is "on." FIG. 4(b) illustrates pixels having priority elements "0" and "1" as "on." Next, pixels having priority elements "0", "1" and "2" are turned "on", as shown in FIG. 4(c). This process continues by turning "on" the next successive pixel, as illustrated in FIGS. 4(d) through 4(o), until all pixels are turned "on" as depicted in FIG. 4(p).

Cluster dots are illustrated throughout FIG. 4, in particular FIGS. 4(a) through 4(l). FIG. 4 illustrates how Moiré patterns can result from cluster dots. For example, if two halftone screens having the pattern illustrated in FIG. 4(a) were superimposed over one another at varying degrees, one screen at zero degrees, the second screen at 45 degrees, rosettes would form in the image. FIG. 4(q) is a pictorial representation of two halftone screens at a 45 degree angle offset from each other showing rosettes.

Figure 4R:
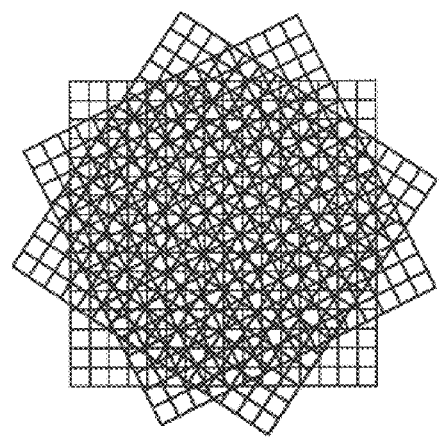

The rosette patterns becomes more pronounced as more halftone screens are combined. For example, for three halftone screens, as would be used for cyan, magenta, and yellow, the rosette patterns are much more noticeable to the human eye. FIG. 4(r) is a pictorial representation of three halftone screens with rosettes. The rosettes are more visible and larger in number than they are with two screens.

Referring to FIG. 5, a pictorial representation of a line screen is illustrated. As discussed earlier, line screens place the toner (i.e., ink) in lines that parallel the direction of paper movement. One problem with line screens is that the placement of the lines must be controlled. Also, the lines must be very thin in order to get a sufficient number of gray levels in very light areas. For example, to obtain 256 levels of gray, the thickness of the line must be controllable to at least 1/256 of full line width. Printing very thin lines can be difficult, if not impossible, for laser printers. This means it is very difficult to control very light image areas. Cluster dots are better at maintaining controlled growth, but as discussed earlier, in the darker areas unaccounted for overlaps of ink cause hue shifts.

Figure 6:
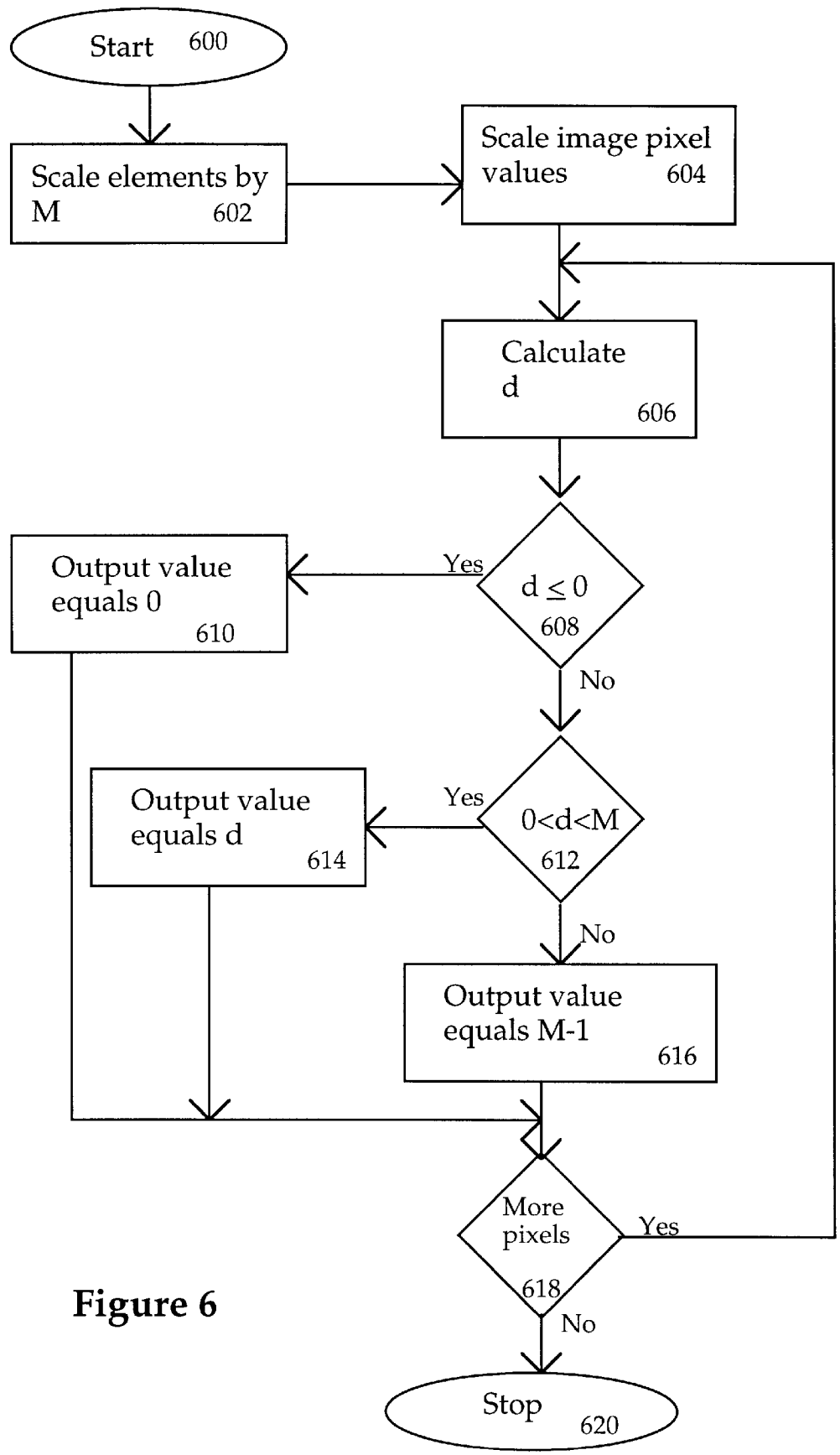
FIG. 6 is a flowchart illustrating a preferred method for halftoning according to the present invention.

The present invention includes a method for halftoning which insures that light areas simulate a cluster dot halftone cell, and darker areas simulate a line screen. This provides for superior light areas while minimizing the problems associated with mechanical misregistration. FIG. 6 is a flowchart illustrating a preferred method for halftoning according to the present invention. The preferred method for halftoning begins at block 600 with a priority array that contains elements consisting of integer values between 0 (zero) and N−1. N equals the number of pixels in a halftone cell.

Next, each element in the priority array is multiplied by a factor M, as shown in block 602. M is preferably the number of gray levels each pixel of the output device is capable of representing. This scales the elements in the priority array to a range of 0 to MN−1.

The pixel tonal values are then scaled so that the pixel values in the image fall between 0 and NM−1. This step is illustrated in block 604. Each scaled pixel value is then compared against its corresponding scaled element. This is accomplished in the preferred embodiment by computing a difference, d, between the scaled pixel value v and the value of the corresponding threshold array, t, i.e., d=t−v. Block 606 depicts this step.

Next, a determination is made as to whether or not d is less than or equal to 0, as shown in block 608. If d is less than or equal to zero, the resulting output value for the pixel is assigned to be 0 (zero). In the preferred embodiment, 0 is white. This step is depicted in block 610.

If d is greater than 0, the process continues at block 612 with a determination as to whether or not d is greater than 0 but less than M. If d is greater than 0 but less than M, the resulting output value for the pixel is assigned to be d, as shown in block 614. A resulting output value of d is gray in the preferred embodiment. "Gray" means a non-saturated value for a pixel.

If d is greater than or equal to M, the resulting halftone output value for the pixel is assigned to be M−1. This step is illustrated in block 616. M−1 represents black, or fully saturated value for a pixel.

The next step is depicted in block 618, where a determination is made as to whether or not there are more pixels that need to be processed. If there are more pixels, the process returns to block 606, and the steps illustrated in blocks 606 through 618 are repeated until there are no more pixels to be processed. The method then ends at block 620.

One advantage to the preferred method of halftoning is that it minimizes the amount of pixels that are neither fully "on" nor fully "off." It is very hard for some printers, such as laser printers, to control the gray level that is printed when a pixel is neither fully "on" nor fully "off." This problem of controlling gray levels for pixels that are neither fully "on" nor "off" is exacerbated when partial pixels are adjacent to one another. Additionally, temperature and humidity affect the stability of gray levels. When halftoning is performed according to the preferred embodiment, an area of constant color or gray contone will yield at most one gray pixel per halftone cell.

Prior art methods for halftoning using threshold arrays do not limit the number of gray pixels to one per halftone cell. For example, on pages 64–65 of *Graphic Gems II* (1991), ISBN 0-12-064480-0, pseudo-code is presented for an algorithm that generates multiple halftone output values. This algorithm creates more than one gray pixel for a halftone cell.

It should be appreciated by those skilled in the art that the method for halftoning described with reference to FIG. 6 describes only one way to compute which pixel is neither fully "on" or "off" and what the halftoned value is for that pixel. For example, one alternative method of halftoning involves scaling only the elements in the priority array. This alternative method begins with having a select range of pixel values. For example, the pixel tonal values may range from 0 to 255. Each elements in the priority array are then scaled by a factor P, which in this example is 256/N.

A pixel tonal value is then compared against its corresponding scaled element. This is preferably accomplished by computing a difference, d, between the pixel value v and the value of the corresponding threshold array element, t, i.e., d=t−v. If d is less than or equal to 0, the resultant halftoned output value is assigned to be 0. If d is greater than 256/M, the resultant halftoned output value is assigned a value of M−1. And finally, if d is greater than 0 but less than 256/M, the resulting output value is assigned the value (d*M)/256.

Figure 7:
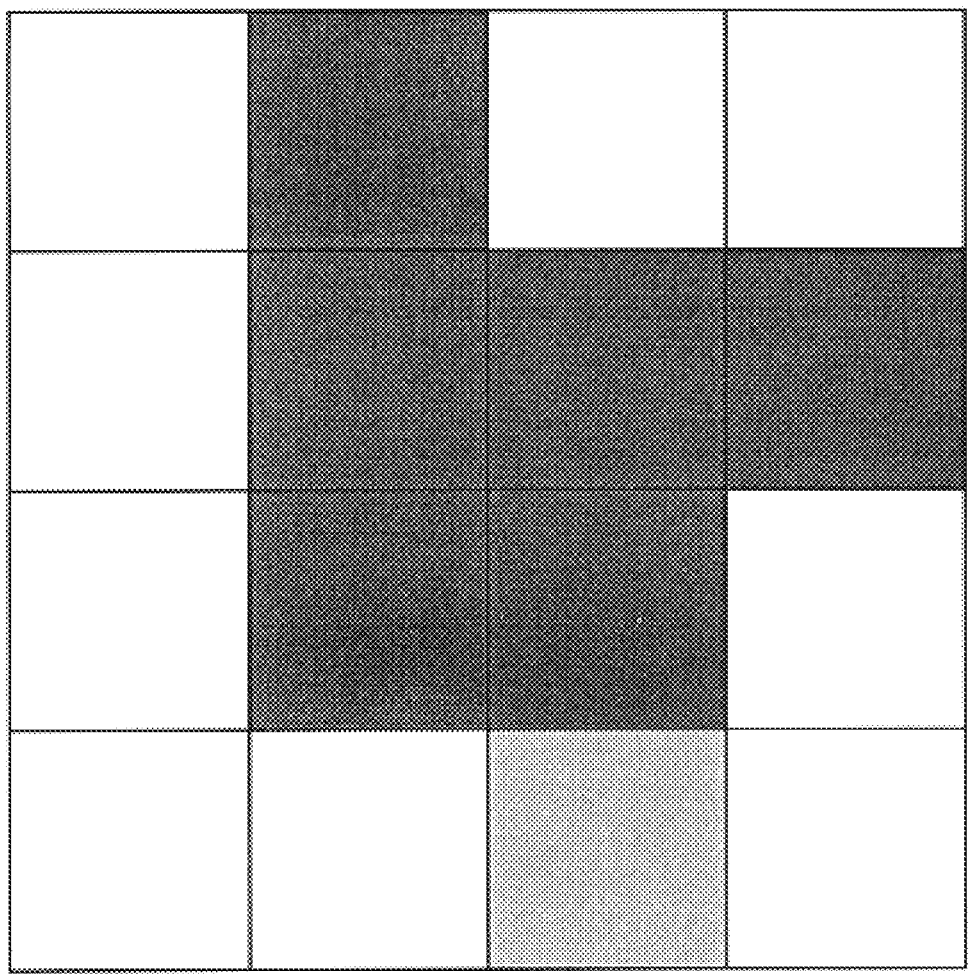
FIG. 7 is a pictorial representation of a halftoned cell halftoned pursuant to the preferred method for halftoning shown in FIG. 6.

FIG. 7 is a pictorial representation of a halftoned cell halftoned pursuant to the preferred method for halftoning shown in FIG. 6. Note that only one pixel is gray.

FIGS. 8(a)–8(r) are pictorial representations of an area including eight halftone cells which illustrate a preferred method halftoning transparent planes according to the present invention. Preferably, the threshold array for transparent planes contains two 3×6 halftone cells, and the elements are as follows:

| 13 | 7  | 4 | 16 | 10 | 1 |
|----|----|---|----|----|---|
| 12 | 8  | 5 | 15 | 11 | 2 |
| 17 | 9  | 0 | 14 | 6  | 3 |
| 16 | 10 | 1 | 13 | 7  | 4 |
| 15 | 11 | 2 | 12 | 8  | 5 |
| 14 | 6  | 3 | 17 | 9  | 0 |

FIG. 8 illustrates how the preferred halftone screen grows as the pixel tonal values increase. In FIG. 8(a), the pixels with the assigned element of "0" are shown "on." FIG. 8(b) illustrates pixels having threshold elements "0" and "1" as "on." Next, pixels having threshold elements "0", "1" and "2" are turned "on", as shown in FIG. 8(c). This process continues by turning "on" two pixels at a time, as shown in FIGS. 8(d) through 8(q), until all pixels are turned fully "on" in FIG. 8(r).

In the preferred embodiment, the method for halftoning is utilized with a 600 dots per inch (dpi) printer. The resulting output values associated array elements of 0 to 2 appear as a 45 degree angled cluster dots with a frequency of 141 lines per inch (lpi). As the pixel tonal values increase (i.e., become darker), elements in the threshold array having larger numbers begin to show. By the time the pixel tonal value equals or exceeds threshold element value 5, the halftone screen has the nature of parallel lines at a pitch of 200 lines per inch. A pitch of 200 lpi improves the image quality because it makes the halftoned screen look tighter than 141 dpi.

FIGS. 9(a)–9(r) are pictorial representations of an area including eight halftone cells which illustrate a preferred method halftoning a opaque plane according to the present invention. Preferably, the threshold array for an opaque plane contains two 3×6 halftone cells, and the elements are as follows:

| 4 | 10 | 13 | 1 | 7  | 16 |
|---|----|----|---|----|----|
| 5 | 9  | 12 | 2 | 6  | 15 |
| 0 | 8  | 17 | 3 | 11 | 14 |
| 1 | 7  | 16 | 4 | 10 | 13 |
| 2 | 6  | 15 | 5 | 9  | 12 |
| 3 | 11 | 14 | 0 | 8  | 17 |

The preferred threshold array elements for an opaque plane are in reverse order from the priority array elements for transparent planes. Thus, 17 is 0, 16 is 1, etc., on down to 0 being 17. This means the priority array for opaque planes is a complement of the array for transparent planes. Alternatively, any inks where overlap is not desired should use the complementary priority array.

FIG. 9 depicts how the preferred halftone pattern grows as the pixel tonal values increase. In FIG. 9(a), the pixels with the assigned element of "0" are shown "on." FIG. 9(b) illustrates pixels having threshold elements "0" and "1" as "on." Next, pixels having threshold elements "0", "1" and "2" are turned "on", as shown in FIG. 9(c). This process continues by turning "on" two pixels at a time, as shown in FIGS. 9(d) through 9(q), until all pixels are turned fully "on" in FIG. 9(r).

FIGS. 10(a)–10(f) are pictorial representations of an area including eight halftone cells which depict a preferred method for halftoning opaque and transparent planes according to the present invention. FIG. 10 is FIGS. 8 and 9 combined up to the point where elements 1–5 are halftoned. As can be seen, for areas of light tonal values, the halftone screen has the properties of a cluster dot pattern. But as the pixel tonal values increase (become darker), the halftone screen evolves into a line screen. Note that there is no overlap between the colors. This remains true even if a mechanical misregistration in the direction of paper movement occurs.

Figure 11:
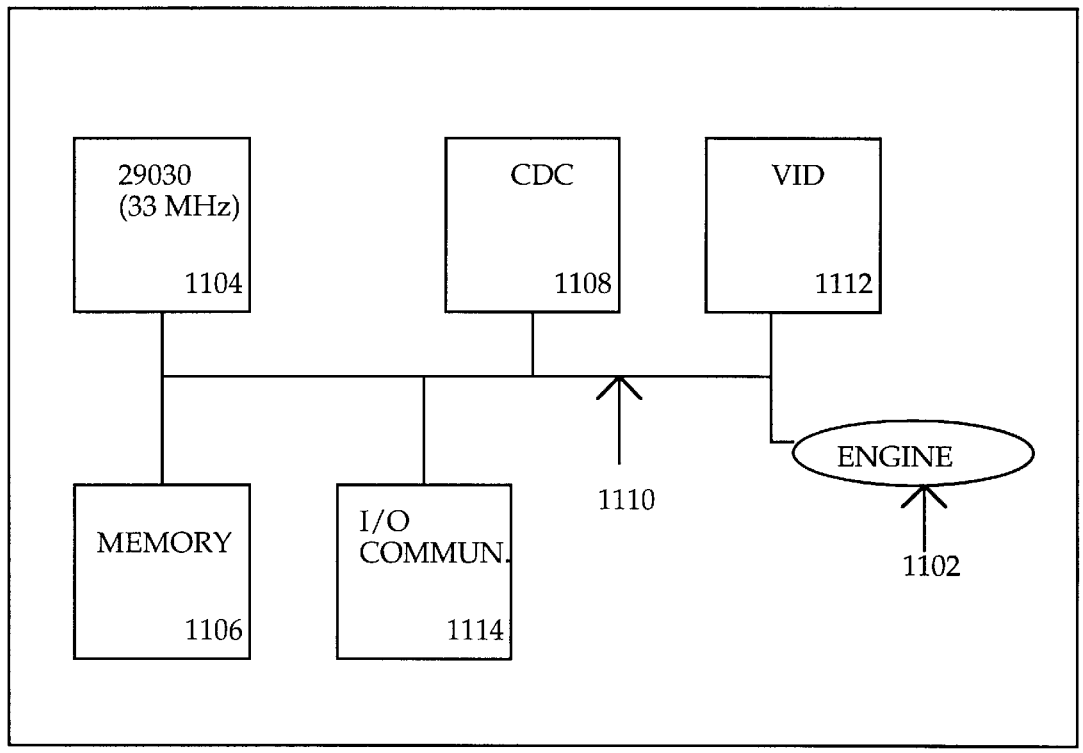
FIG. 11 is a high level block diagram of a preferred apparatus used to implement the preferred method for color halftoning according to the present invention.

FIG. 11 is a high level block diagram of a preferred apparatus used to implement the preferred method for color halftoning according to the present invention. FIG. 11 illustrates a printing system 1100 which incorporates features of the present invention. Printing system 1100 includes a color laser engine 1102, such as any commercially available color laser marking engine. For purposes of the following discussion, the term "color" includes the use of multiple colors (such as cyan, magenta, and yellow), as well as gray scale printing using varying shades of gray.

Printing system 1100 includes a processor, represented in FIG. 11 as printing system controller 1104 having associated memory 1106. Printing system controller 1104 can be a reduced instruction set computer (RISC) such as the 33 Megahertz 29030 processor available from Advanced Micro Devices. Printing system controller 1104 performs such functions as scaling, partitioning, resampling, and filtering in the preferred embodiment.

Printing system 1100 also includes a compression/decompression coprocessor (CDC) 1108. CDC coprocessor 1108 compresses image data in order to substantially reduce the memory requirements needed to store image data. However, if cost is not a concern, CDC coprocessor 1108 can be left out completely in a color printing system. CDC coprocessor 1108 can, for example, be formed as a monolithic application specific integrated circuit (ASIC). Those skilled in the art, however, will appreciate that the processing implemented by CDC coprocessor 1108 can be performed by the same processor for printing system controller 1104.

Once image data is compressed and stored in memory by CDC coprocessor 1108, it can subsequently be transferred to printer engine 1102 via system bus 1110 and video interface device (VID) 1112. VID 1112 provides high quality reproduction of the original image from its compressed format. VID 1112 may, for example, be formed as a separate ASIC having a decompression processor to support decompression and halftoning. Alternatively, a single processor can be used to implement the functions of printing system controller 1104, CDC coprocessor 1108, and VID 1112.

Printing system 1100 further includes an input/output (I/O) communications device 1114. I/O communications device 1114 may include, for example, built-in networking support as well as parallel/serial I/O ports. I/O communications device 1114 can also include additional memory as well as memory expansion ports.

Figure 12:
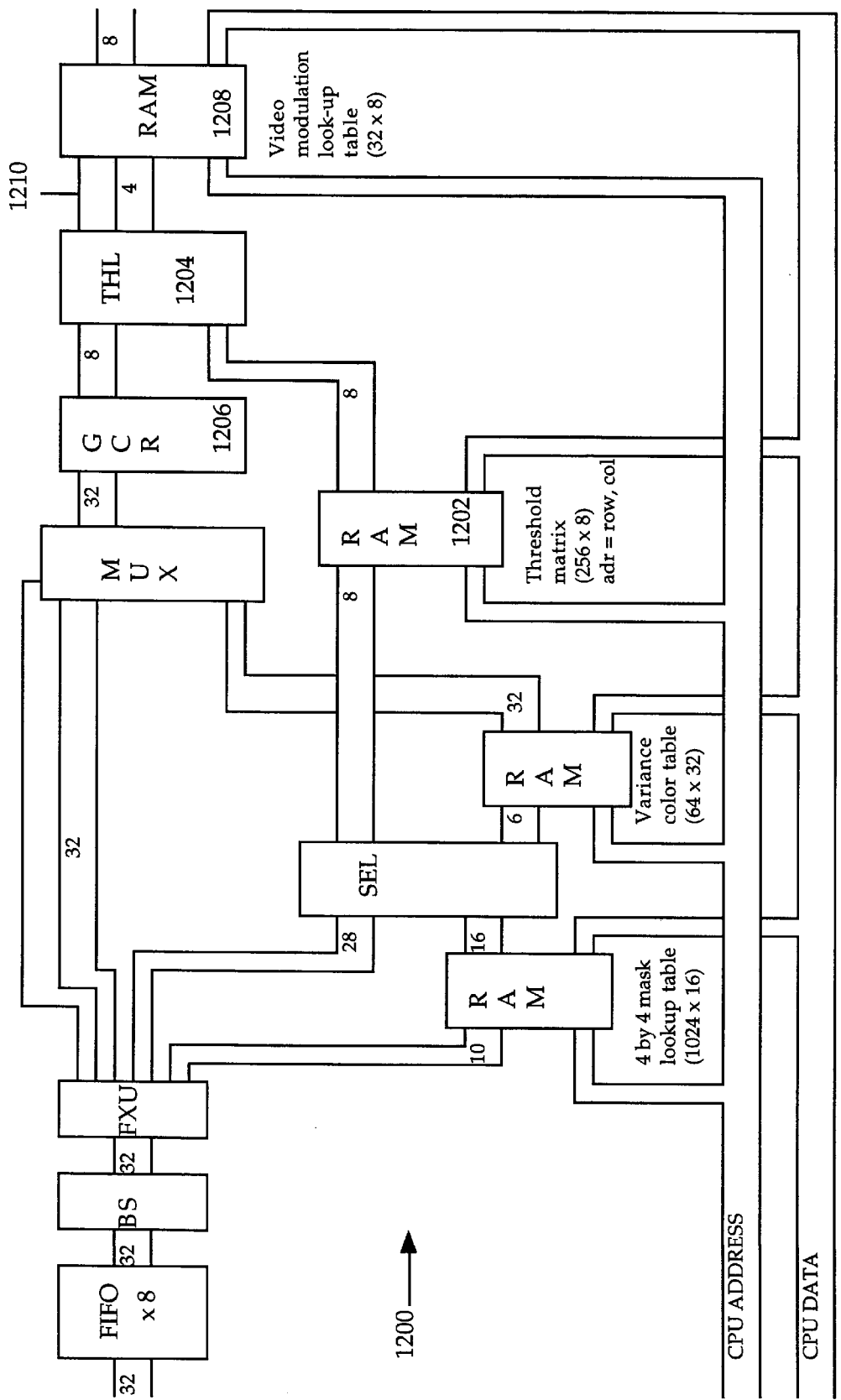
FIG. 12 is a more detailed block diagram of a portion of block 1112 in FIG. 11 for implementing the method for color halftoning according to the present invention.

Referring to FIG. 12, a more detailed block diagram of a portion of block 1112 in FIG. 11 for implementing the method for color halftoning according to the present invention is illustrated. In particular, FIG. 12 depicts a portion of a decompression apparatus 1200 according to the present invention. For clarity, only the blocks relevant to halftoning will be described.

The threshold arrays of the preferred embodiment are stored in threshold memory 1202. 4-bits output from a separate modulo-m row counter and 4-bits output from a separate modulo-n counter are used to address threshold memory 1202. The values of m and n are preferably selected independently as a number between 1 and 16, m and n being determined by the desired height of the threshold array and desired width of the threshold array, respectively. An 8-bit output from threshold memory 1202 is provided for each pixel in the threshold array to threshold logic 1204, along with an 8-bit output from gray component removal block 1206. Gray component removal block 1206 performs gray component removal, a process known in the art.

Threshold logic block 1204 halftones the 8-bit input pixel so that the resulting halftoned value is a 4-bit multi-level output value per pixel. The 4-bit gray output value is supplied as an input to video modulation look-up table 1208. Video modulation look-up table 1208 is used to convert the 4-bit gray output value to a data format for use by the color laser marking engine. Depending on the color laser marking engine, the data format can be a serial video for direct sub-pixel modulation of the laser diode, or 8-bit parallel video to a continuous tone interface.

Video modulation look-up table 1208 preferably has thirty-two entries. The first sixteen of which are used for isolated pixels that do not have a black (i.e. fully saturated) pixel to the left or right. The second sixteen entries are used for pixels that have a black pixel adjacent to it (as identified by the most significant bit, labeled address line 1210). This scheme is used because most print engines have different transfer characteristics for a single gray pixel and for a gray pixel connected to a black pixel. Because exemplary embodiments of the present invention include less than a full scan line buffer, this technique is applied only in the horizontal direction.

Figure 13:
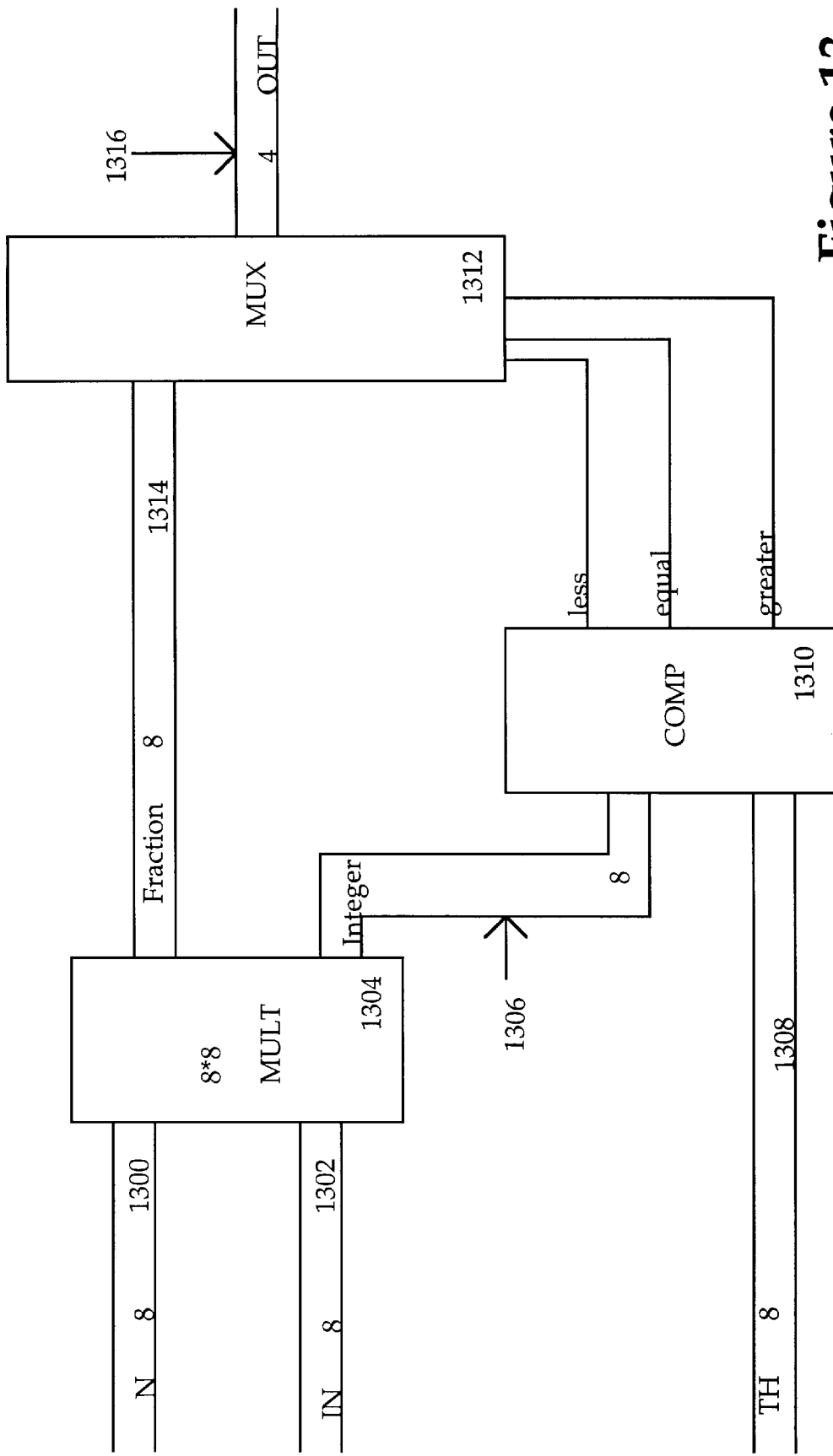
FIG. 13 is a more detailed block diagram of a portion of block 1204 in FIG. 12 for implementing the method for color halftoning according to the present invention.

FIG. 13 is a more detailed block diagram of a portion of block 1204 in FIG. 12 for implementing the method for color halftoning according to the present invention. The number of pixels in one halftone cell (N) 1300 and the 8-bit output (IN) 1302 from the gray component removal block are input into multiplier 1304. In the preferred embodiment, N equals the number of pixels in one halftone cell, which is eighteen. These two values are multiplied and the result is divided by the number of input levels, which in the preferred embodiment is 256.

The integer value 1306 of the result is compared to the 8-bit output 1308 from the threshold memory in comparator 1310. The result of this comparison controls multiplexer 1312. In the preferred embodiment, multiplexer 1312 selects the four most significant bits included in the fractional value 1314 of the output from multiplier 1304 to be the 4-bit output 1316 when integer value 1306 equals the 8-bit output 1308 from the threshold memory. In this situation, 4-bit output 1318 corresponds to gray (i.e., not fully saturated). If integer value 1306 is less than 8-bit output 1308, the 4-bit output 1316 is selected to be 0000. In the preferred embodiment, 0000 corresponds to white. If integer value 1306 is greater than 8-bit output 1308, the 4-bit output 1316 is selected to be 1111. 1111 corresponds to black, or fully saturated, in the preferred embodiment.

While the invention has been particularly shown and described with reference to a preferred embodiment, it will be understood by those skilled in the art that various changes in form and detail may be made therein without departing from the spirit and scope of the invention. For example, the method for halftoning may be implemented using software instead of hardware. Furthermore, the preferred embodiment has been described with reference to a printer. The apparatus and method of the present invention, however, can be used in any processor controlled device or combination of devices, with one example being a computer. The method and apparatus of the present invention can also be used with other output devices having limited gray levels, such as LCD displays. And finally, a threshold array does not have to be utilized in that any equivalent method which derives the elements of a threshold array can be used in place of the threshold array.

What is claimed is:

1. A method for halftoning a plurality of pixels in an opaque plane, wherein each of the plurality of pixels has a tonal value associated therewith and the plurality of pixels are multi-level pixels having more than two possible output values, and wherein an element in a threshold array is associated with each pixel, said method comprising the steps of:

utilizing a halftone screen that simulates a cluster dot screen for pixel tonal values that are less that a particular value; and once the pixel tonal values equal or exceed the particular value, evolving the halftone screen such that it simulates a line screen.

2. The method of claim 1, wherein the step of utilizing a halftone screen that simulates a cluster dot screen for pixel tonal values that are less that a particular value comprises the step of utilizing a halftone screen that simulates a cluster dot screen for pixel tonal values that are less that a particular element value in the threshold array.

3. The method of claim 1, wherein the threshold array for the opaque plane is comprised of two 3×6 halftone cells, and the elements in the threshold array are

| 4 | 10 | 13 | 1 | 7  | 16 |
|---|----|----|---|----|----|
| 5 | 9  | 12 | 2 | 6  | 15 |
| 0 | 8  | 17 | 3 | 11 | 14 |
| 1 | 7  | 16 | 4 | 10 | 13 |
| 2 | 6  | 15 | 5 | 9  | 12 |
| 3 | 11 | 14 | 0 | 8  | 17 |

4. A method for halftoning a plurality of pixels in a transparent plane, wherein each of the plurality of pixels has a tonal value associated therewith and the plurally of pixels are multi-level pixels having more than two possible output values, and wherein an element in a threshold array is associated with each pixel, said method comprising the steps of:

utilizing a halftone screen that simulates a cluster dot screen for pixel tonal values that are less that a particular value; and once the pixel tonal values equal or exceed the particular value, evolving the halftone screen such that it simulates a line screen.

5. The method of claim 4, wherein the step of utilizing a halftone screen that simulates a cluster dot screen for pixel tonal values that are less that a particular value comprises the step of utilizing a halftone screen that simulates a cluster dot screen for pixel tonal values that are less that a particular element value in the threshold array.

6. The method of claim 4, wherein the threshold array for the transparent plane is comprised of two 3×6 halftone cells, and the elements in the threshold array are

| 13 | 7  | 4 | 16 | 10 | 1 |
|----|----|---|----|----|---|
| 12 | 8  | 5 | 15 | 11 | 2 |
| 17 | 9  | 0 | 14 | 6  | 3 |
| 16 | 10 | 1 | 13 | 7  | 4 |
| 15 | 11 | 2 | 12 | 8  | 5 |
| 14 | 6  | 3 | 17 | 9  | 0 |

7. A method for halftoning a plurality of pixels, wherein each of the plurality of pixels has a tonal value associated therewith and the plurality of pixels are multi-level pixels having more than two possible output values, and wherein an element in a threshold array is associated with each pixel, said method comprising the steps of:

scaling the elements in the threshold array by multiplying each by a factor m, wherein m is equal to the number of gray levels each pixel is capable of representing;

scaling the pixel tonal values so that each pixel tonal value is greater than or equal to zero but less than or equal to a value equal to mn−1, where n is the number of pixels in a halftone cell;

comparing each pixel tonal value against its associated element;

computing a difference (d) between the pixel tonal value and its associated element;

determining whether d is less than or equal to zero;

if d is less than or equal to zero, setting an output value to a value equal to zero;

if d is greater than zero but less than m, setting the output value to a value equal to d; and if d is greater than m, setting the output value to a value equal to m−1.

8. A method for halftoning a plurality of pixels, wherein each of the plurality of pixels has a tonal value associated therewith and the plurality of pixels are multi-level pixels having more than two possible output values, and wherein an element in a priority array is associated with each pixel, said method comprising the steps of:

scaling the elements in the priority array by multiplying each by a factor m, wherein m is equal to the number of gray levels each pixel is capable of representing;

scaling the pixel tonal values so that each pixel tonal value is greater than or equal to zero but less than or equal to a value equal to mn−1, where n is the number of pixels in a halftone cell;

comparing each pixel tonal value against its associated element;

computing a difference (d) between the pixel tonal value and its associated element;

determining whether d is less than or equal to zero;

if d is less than or equal to zero, setting an output value to a value equal to zero;

if d is greater than zero but less than m, setting the output value to a value equal to d; and if d is greater than m, setting the output value to a value equal to m−1.

9. An apparatus for halftoning a plurality of pixels, wherein each of the plurality of pixels has a tonal value associated therewith and the plurality of pixels are multi-level pixels having more than two possible output values, and wherein an element in a threshold array is associated with each pixel, said apparatus comprising:

means for scaling the elements in the threshold array by multiplying each by a factor m, wherein m is equal to the number of gray levels each pixel is capable of representing;

means for scaling the pixel tonal values so that each pixel tonal value is greater than or equal to zero but less than or equal to a value equal to mn−1, where n is the number of pixels in a halftone cell;

means for comparing each pixel tonal value against its associated element;

means for computing a difference (d) between the pixel tonal value and its corresponding element;

means for determining whether d is less than or equal to zero;

if d is less than or equal to zero, means for setting an output value to a value equal to zero;

if d is greater than zero but less than m, means for setting the output value to a value equal to d; and if d is greater than (m), means for setting the output value to a value equal to m−1.

10. An apparatus for halftoning a plurality of pixels, wherein each of the plurality of pixels has a tonal value associated therewith and the plurality of pixels are multi-level pixels having more than two possible output values, and wherein an element in a priority array is associated with each pixel, said apparatus comprising:

means for scaling the elements in the priority array by multiplying each by a factor m, wherein m is equal to the number of gray levels each pixel is capable of representing;

means for scaling the pixel tonal values so that each pixel tonal value is greater than or equal to zero but less than or equal to a value equal to mn−1, where n is the number of pixels in a halftone cell;

comparing each pixel tonal value against its associated element;

means for computing a difference (d) between the pixel tonal value and its associated element;

means for determining whether d is less than or equal to zero;

if d is less than or equal to zero, means for setting an output value to a value equal to zero;

if d is greater than zero but less than m, means for setting the output value to a value equal to d; and if d is greater than m, means for setting the output value to a value equal to m−1.

* * * * *